US008555347B2

(12) United States Patent
De Graaf et al.

(10) Patent No.: US 8,555,347 B2
(45) Date of Patent: Oct. 8, 2013

(54) DYNAMIC HOST CONFIGURATION PROTOCOL (DHCP) AUTHENTICATION USING CHALLENGE HANDSHAKE AUTHENTICATION PROTOCOL (CHAP) CHALLENGE

(75) Inventors: Kathryn De Graaf, Northboro, MA (US); John Liddy, Gardner, MA (US); Paul Raison, Windham, NH (US); John C. Scano, Dracut, MA (US); Sanjay Wadhwa, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 457 days.

(21) Appl. No.: 12/644,365

(22) Filed: Dec. 22, 2009

(65) Prior Publication Data

US 2011/0154440 A1   Jun. 23, 2011

(51) Int. Cl.
*G06F 15/16* (2006.01)
*H04L 29/06* (2006.01)

(52) U.S. Cl.
CPC ..................................... *H04L 63/08* (2013.01)
USPC .................................. 726/4; 726/3; 713/155

(58) Field of Classification Search
None
See application file for complete search history.

(56) References Cited

U.S. PATENT DOCUMENTS

2005/0102517 A1* 5/2005 Paddon et al. ................. 713/168
2007/0180499 A1* 8/2007 Van Bemmel ..................... 726/4
2007/0189249 A1* 8/2007 Gurevich et al. ............. 370/338
2008/0043687 A1* 2/2008 Lee ................................ 370/338
2009/0132682 A1* 5/2009 Counterman ................. 709/220

OTHER PUBLICATIONS

W. Simpson, RFC 1994, "PPP Challenge Handshake Authentication Protocol (CHAP)", Network Working Group, Aug. 1996, 14 pages.*
Mukherjee et al. (Extensions to DHCP for Roaming Users), Internet Engineering Task Force, Feb. 2001, 15 Pages.*
Droms, "Dynamic Host Configuration Protocol", Network Working Group, RFC-2131, Mar. 1997, 46 pages.
Rigney et al., "Remote Authentication Dial in User Service (RADIUS)", Network Working Group, RFC-2865, Jun. 2000, 77 pages.
Patrick, "DHCP Relay Agent Information Option", Network Working Group, RFC-3046, Jan. 2001, 14 pages.

* cited by examiner

*Primary Examiner* — Matthew Henning
(74) *Attorney, Agent, or Firm* — Harrity & Harrity, LLP

(57) ABSTRACT

A method performed by a Dynamic Host Configuration Protocol (DHCP) server comprising receiving a DHCP DISCOVER message from a DHCP client; generating a challenge in response to the DHCP DISCOVER message; sending the challenge to an authentication device; receiving a first challenge response from the authentication device; generating a DHCP OFFER message; sending the challenge to the DHCP client in the DHCP OFFER message; receiving a DHCP REQUEST message that includes a second challenge response from the DHCP client; comparing the first challenge response with the second challenge response; and authenticating the DHCP client when the first challenge response and the second challenge response match.

21 Claims, 7 Drawing Sheets

DYNAMIC HOST CONFIGURATION PROTOCOL (DHCP) AUTHENTICATION USING CHALLENGE HANDSHAKE AUTHENTICATION PROTOCOL (CHAP) CHALLENGE

BACKGROUND

In a typical scenario, a Dynamic Host Configuration Protocol (DHCP) client may connect to a DHCP server to request and/or acquire a network address (e.g., an Internet Protocol address) and other configuration parameters (e.g., parameters associated with a default gateway, a domain name, etc.). However, the DHCP does not provide a method to authenticate the DHCP client when the DHCP client requests a network address and/or other configuration parameters.

SUMMARY

According to an exemplary implementation, a method may include receiving, by a network device, a Dynamic Host Configuration Protocol (DHCP) DISCOVER message from a DHCP client; generating, by the network device, a challenge in response to the DHCP DISCOVER message; sending, by the network device, the challenge to an authentication device; receiving, by the network device, a first challenge response from the authentication device; generating, by the network device, a DHCP OFFER message; sending, by the network device, the challenge to the DHCP client in the DHCP OFFER message; receiving, by the network device, a DHCP REQUEST message that includes a second challenge response from the DHCP client; comparing, by the network device, the first challenge response with the second challenge response; and authenticating, by the network device, the DHCP client when the first challenge response and the second challenge response match.

According to another exemplary implementation, a network device that may include one or more memories to store instructions; and one or more processors to execute the instructions in the one or more memories to: receive a Dynamic Host Configuration Protocol (DHCP) DISCOVER message from a DHCP client; generate a challenge in response to the DHCP DISCOVER message; send the challenge to an authentication device; receive a first challenge response from the authentication device; generate a DHCP OFFER message; insert the challenge in a DHCP options field of the DHCP OFFER message; send the challenge to the DHCP client in the DHCP OFFER message; receive a DHCP REQUEST message that includes a second challenge response from the DHCP client; compare the first challenge response with the second challenge response; and authenticate the DHCP client when the first challenge response and the second challenge response match.

According to yet another exemplary implementation, a computer-readable medium having stored thereon instructions, executable by at least one processor. The computer-readable medium may include one or more instructions for generating a challenge in response to receiving Dynamic Host Configuration Protocol (DHCP) DISCOVER message; one or more instructions for sending the challenge to an authentication device; one or more instructions for receiving a first challenge response from the authentication device; one or more instructions for generating a DHCP OFFER message in response to receipt of the first challenge response; one or more instructions for inserting the challenge in a DHCP options field of the DHCP OFFER message; one or more instructions for sending DHCP OFFER message with the challenge to the DHCP client; one or more instructions for receiving a DHCP REQUEST message that includes a second challenge response from the DHCP client; one or more instructions for comparing the first challenge response with the second challenge response; and one or more instructions for authenticating the DHCP client when the first challenge response and the second challenge response match.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following description does not limit the invention.

Exemplary implementations described herein provide for methods, devices, and/or computer-readable media that authenticate DHCP clients. Unlike other possible solutions, the exemplary implementations described herein may not change the DHCP state machine, may not permit network access prior to authentication, may operate in-band versus out-of-band, where an out-of-band may involve assigning temporary network addresses, thus requiring subsequent network address assignments, may traverse layer 2 devices (e.g., bridges, etc.), and/or may allow for authentication of multiple DHCP clients of the same local loop.

In an exemplary implementation, a user device (including a DHCP client) and an authentication device (e.g., a Remote Authentication Dial In User Service (RADIUS) server, an Authentication, Authorization, and Accounting (AAA) server, etc.) may share a secret (e.g., a password, a personal identifier, etc.). An intermediary device may generate challenges to both the user device and the authentication device. The user device and the authentication device may generate responses to the challenges based on the shared secret and send the challenge responses to the intermediary device. When the intermediary device receives the challenge responses, the intermediary device may compare the challenge responses to determine whether they match. If the challenge responses match, the DHCP client associated with the user device may be authenticated. An exemplary implementation of the authentication process for a DHCP client is described below in which the DHCP and the RADIUS protocol are utilized.

Exemplary Environment

Figure 1A:
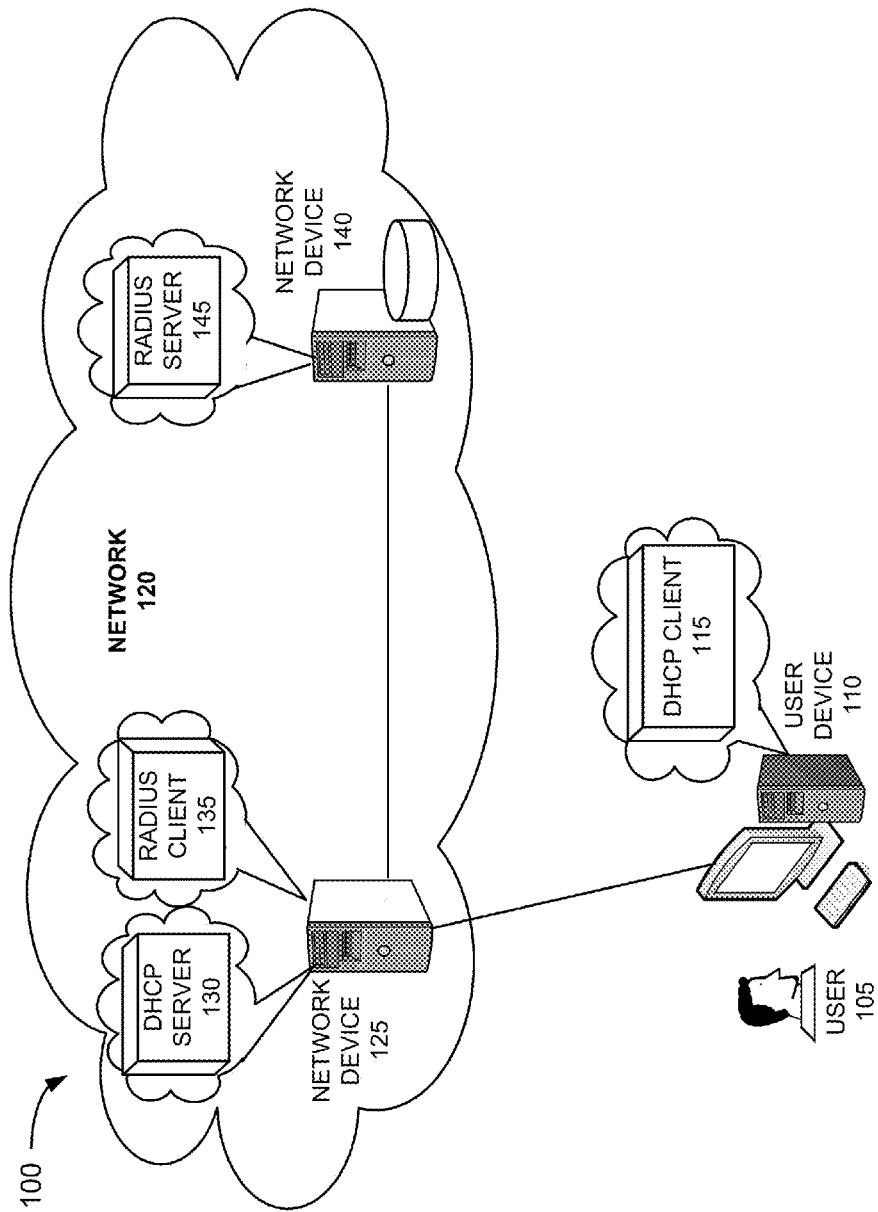
FIG. 1A is a diagram illustrating an exemplary environment in which an exemplary implementation of methods, devices, and/or computer-readable media that provide authentication for DHCP clients may be utilized.

FIG. 1A is a diagram illustrating an exemplary environment 100 in which an exemplary implementation of methods, devices, and/or computer-readable media that provide authentication for DHCP clients may be utilized. As illustrated, exemplary environment 100 may include a user 105, a user device 110 that includes a DHCP client 115, and a network 120. Network 120 may include a network device 125 that includes a DHCP server 130 and a RADIUS client 135, and a network device 140 that includes a RADIUS server 145.

The number of devices and configuration in environment 100 is exemplary and provided for simplicity. In practice, environment 100 may include more devices and/or networks, fewer devices and/or networks, different devices and/or networks, and/or differently arranged devices and/or networks than those illustrated in FIG. 1A. For example, while FIG. 1A illustrates DHCP server 130, in another exemplary implementation, a DHCP relay may be utilized instead of DHCP server 130. Additionally, or alternatively, while FIG. 1A illustrates RADIUS server 145, in another exemplary implementation, an AAA server or some other device that provides authentication services may be utilized instead of RADIUS server 145. Additionally, while the exemplary implementation described in FIGS. 1A and 1B utilizes the RADIUS protocol, other protocols may be utilized (e.g., the Diameter protocol). Also, some functions described as being performed by a particular device may be performed by a different device or a combination of devices.

User 105 may correspond to a service subscriber. User device 110 may include a device capable of communicating with other devices, systems, networks, and/or the like. For example, user device 110 may correspond to a portable device, a mobile device, or a stationary device. By way of example, user device 110 may take the form of a computer (e.g., a desktop computer, a laptop computer, a handheld computer, etc.), a personal digital assistant (PDA), a wireless telephone, a Web-access device, or some other type of computational and/or communicative device. As illustrated, in an exemplary implementation, user device 110 may include, among other things, DHCP client 115. DHCP client 115 may operate according to the DHCP. DHCP client 115 may obtain various configuration parameters (e.g., a network address, etc.) on behalf of user device 110 and user 105. DHCP client 115 may be implemented as a combination of hardware and software, or hardware.

Network 120 may include one or more networks of any type (e.g., wired and/or wireless). By way of example, network 120 may include a local area network (LAN), a wide area network (WAN), a data network, a private network, an Intranet, a public network, the Internet, and/or a combination of networks. Network may operate according to any number of protocols, standards, etc.

Network device 125 may include a device capable of communicating with other devices, systems, networks, and/or the like. For example, network device 125 may take the form of a network computer, a server, a gateway, an access point, a routing device, and/or some other type of computational and/or communicative device. As illustrated, in an exemplary implementation, network device 125 may include DHCP server 130. DHCP server 130 may operate according to the DHCP. DHCP server 130 may provide DHCP client 115 with various configuration parameters (e.g., a network address, etc.). Network device 125 may also include a RADIUS client 135. RADIUS client 135 may operate according to the RADIUS protocol. DHCP server 130 and RADIUS client 135 may be implemented as a combination of hardware and software, or hardware.

Network device 140 may include a device capable of communication with other devices, systems, networks, and/or the like. For example, network device 140 may take the form of a network computer, a server, a gateway, an access point, a routing device, and/or some other type of computational and/or communicative device. As illustrated, in an exemplary implementation, network device 140 may include RADIUS server 145. RADIUS server 145 may operate according to the RADIUS protocol. RADIUS server 145 may be implemented as a combination of hardware and software, or hardware.

Figure 1B:
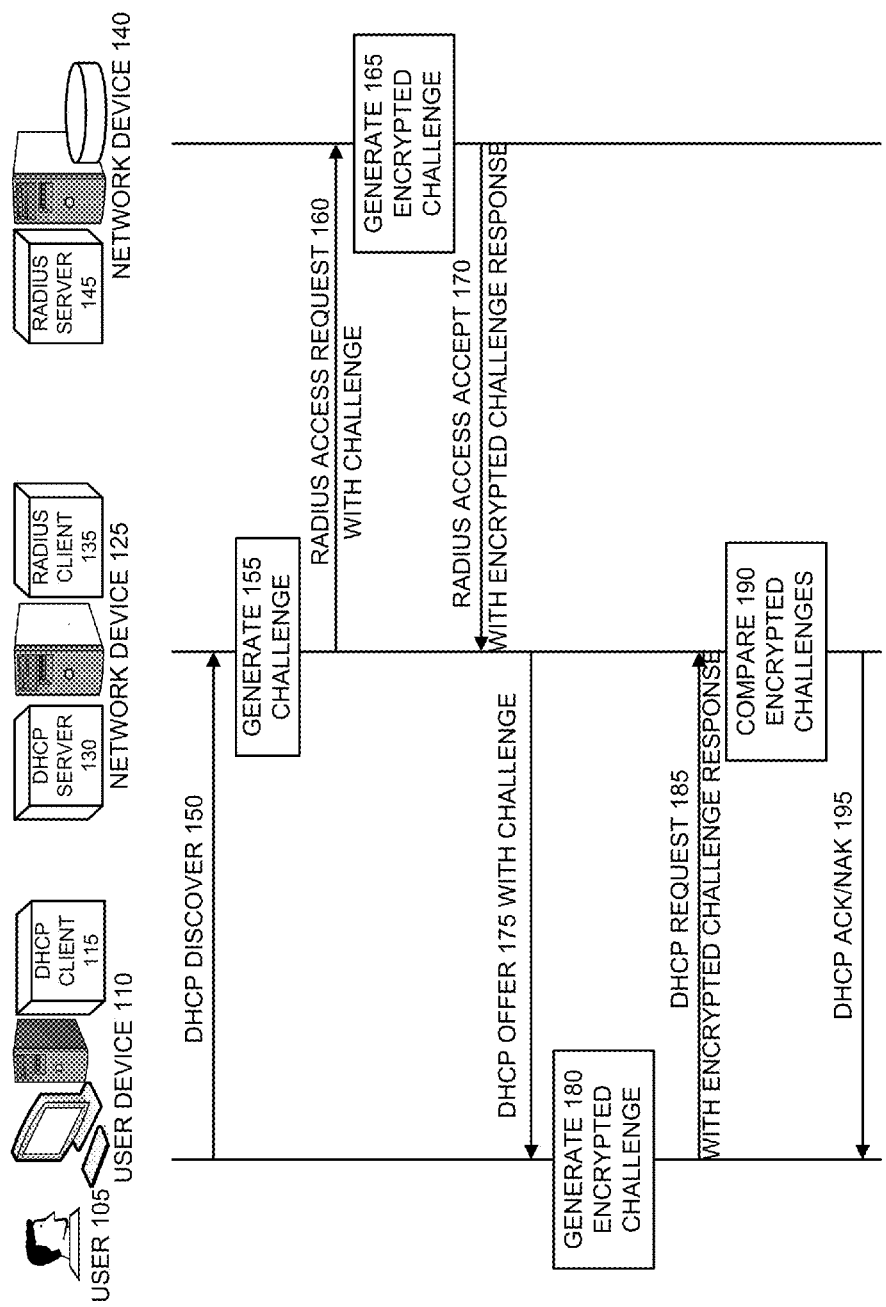
FIG. 1B is a message timing diagram illustrating an exemplary implementation to authenticate the DHCP client in the environment depicted in FIG. 1A.

FIG. 1B is a message timing diagram illustrating an exemplary implementation to authenticate the DHCP client 115. It may be assumed that user device 110 and network device 140 share a secret (e.g., a password, a personal identifier, some other secret information, etc.) that may not be known to network device 125 (e.g., an intermediary device).

Referring to FIG. 1B, in an exemplary implementation, user 105 may wish to access network 120. DHCP client 115 may generate a DHCP DISCOVER message 150 and may send DHCP DISCOVER message 150 to DHCP server 130 of network device 125. In response to receiving DHCP DISCOVER message 150, network device 125 may generate 155 a challenge. In an exemplary implementation, the challenge may correspond to a Challenge Handshake Authentication Protocol (CHAP) challenge. For example, the CHAP challenge may correspond to a string having a random value. Radius client 135 may generate a RADIUS access-request message 160, as indicated by reference number 155, and may insert the CHAP challenge in RADIUS access-request message 160. For example, the CHAP challenge may be inserted in an authenticator field or an attributes field of the RADIUS access-request message 160. RADIUS client 135 may send RADIUS access request message 160 including the CHAP challenge to RADIUS server 145 of network device 140. Unlike current mechanisms (e.g., as set forth in Request For Comment (RFC) 2865, section 2.2), RADIUS access-request 160 may not include a CHAP-password since a CHAP-response has not yet been received from user device 110.

RADIUS server 145 may receive RADIUS access request message 160 including the CHAP challenge. It may be assumed that authorization is successful, and RADIUS server 145 may generate 165 (e.g., using an MD5 hash) an encrypted challenge response. For example, network device 140 may utilize the shared secret (e.g., a password, a personal identifier, or some other secret information) that may be known to both network device 140 and user device 110. RADIUS server 145 may generate a RADIUS access-accept message 170 and may insert the encrypted challenge response in RADIUS access-accept message 170. For example, the encrypted challenge response may be inserted in an authentication field or an attributes field of RADIUS access-accept message 170. RADIUS server 145 may send RADIUS access-accept message 170 including the encrypted challenge response to network device 125.

Network device 125 may receive RADIUS access-accept message 170 including the encrypted challenge response. DHCP server 130 may generate a DHCP OFFER message 175. DHCP server 130 may insert the CHAP challenge into DHCP OFFER message 175. For example, the CHAP challenge may be inserted in a DHCP options field of DHCP OFFER message 175. DHCP server 130 may send the DHCP OFFER message 175 with the CHAP challenge to user device 110.

User device 110 may receive the DHCP OFFER message 175 with the CHAP challenge. User device 110 may generate 180 (e.g., using an MD5 hash) an encrypted challenge response based on the shared secret. DHCP client 115 may generate a DHCP REQUEST 185 and may insert the encrypted challenge response in DHCP REQUEST 185. For example, the encrypted challenge response may be inserted in a DHCP options field of DHCP REQUEST 185. DHCP client 115 may send DHCP REQUEST 185 with the encrypted challenge to network device 125.

DHCP server 130 may receive DHCP REQUEST 185 with the encrypted challenge response. Network device 125 may compare 190 the encrypted challenge responses received from both user device 110 and network device 140. If the encrypted challenge responses match, DHCP server 130 may send a DHCP acknowledgement 195 to DHCP client 115 of user device 110. If the encrypted challenge responses do not match, DHCP server 130 may send a DHCP negative acknowledgement to DHCP client 115.

Although an exemplary implementation has been broadly described, detailed descriptions of various implementations are provided below. Additionally, the utilization of the DHCP options field and the utilization of the RADIUS attributes field, as described above, does not preclude the utilization of these fields to contain other options or attribute information, in addition to, the encrypted challenge responses, as provided by the DHCP and the RADIUS protocol.

Exemplary Device Architecture

Figure 2:
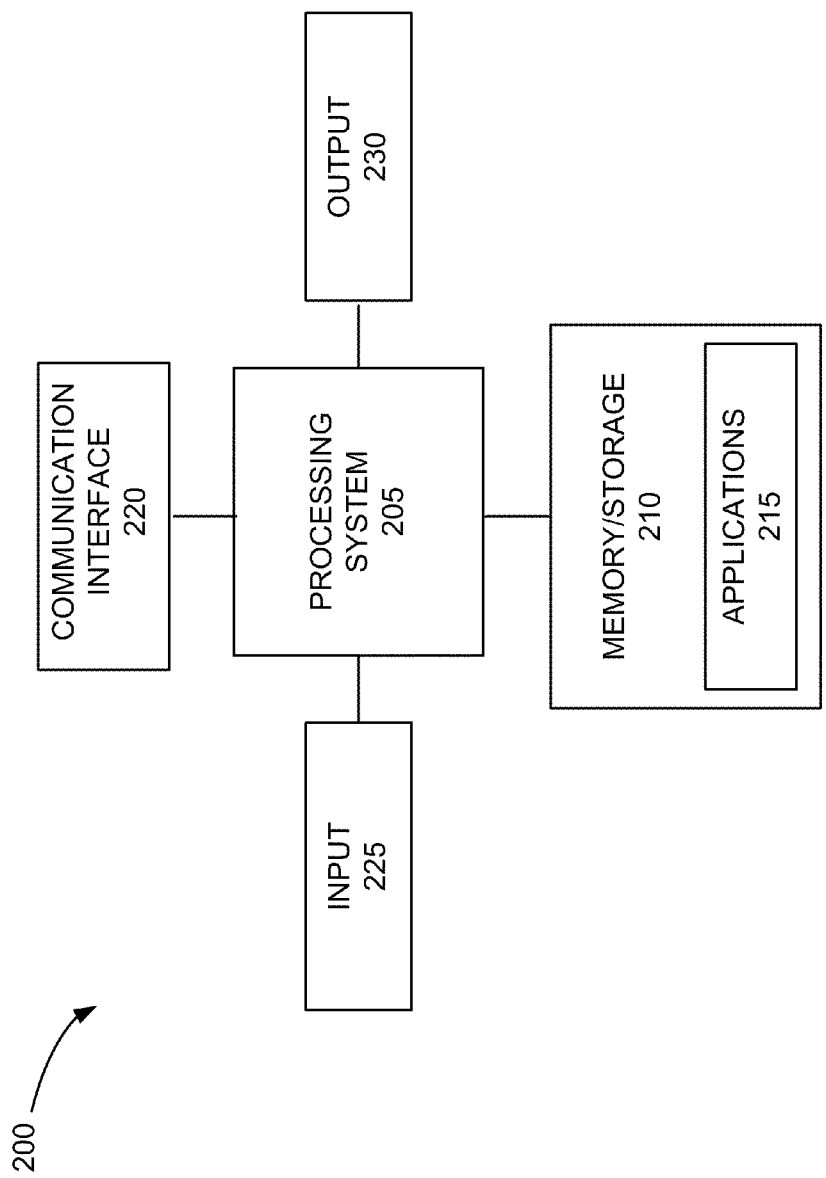
FIG. 2 is a diagram illustrating exemplary components of a device that may correspond to one or more of the devices depicted in FIGS. 1A and 1B.

FIG. 2 is a diagram illustrating exemplary components of a device 200 that may correspond to one or more of the devices depicted in FIGS. 1A and 1B. For example, device 200 may correspond to user device 110, network device 125, and/or network device 140. As illustrated, device 200 may include a processing system 205, memory/storage 210 that includes applications 215, a communication interface 220, an input 225, and an output 230. In other implementations, device 200 may include fewer components, additional components, different components, and/or a different arrangement of components than those illustrated in FIG. 2 and described herein. For example, in other implementations, device 200 may not include secondary storage (e.g., associated with memory/storage 210). Additionally, in other implementations, some functions described as being performed by a particular component of device 200 may be performed by a different component of device 200, or some combination thereof.

Processing system 205 may include one or more processors, microprocessors, data processors, co-processors, application specific integrated circuits (ASICs), application specific instruction-set processors (ASIPs), system-on-chips (SOCs), controllers, programmable logic devices (PLDs), chipsets, field programmable gate arrays (FPGAs), and/or some other component that may interpret and/or execute instructions and/or data. Processing system 205 may control the overall operation, or a portion thereof, of device 200, based on, for example, instructions provided by an operating system (not illustrated) and/or various applications (e.g., applications 215). Processing system 205 may access instructions from memory/storage 210, from other components of device 200, and/or from a source external to device 200 (e.g., a network, such as network 120, or another device).

Memory/storage 210 may include memory and/or secondary storage. For example, memory/storage 210 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may also include a storage device external to and/or removable from device 200, such as, for example, a Universal Serial Bus (USB) memory stick, a hard disk, etc.

The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices. The computer-readable medium may store data and/or instructions configured to implement processes for authenticating the DHCP client, as described herein.

Memory/storage 210 may store data, application(s), and/or instructions related to the operation of device 200. For example, memory/storage 210 may include applications 215 related to providing communications within network 120. Depending on the device to which device 200 corresponds (e.g., user device 110, network device 125, and/or network 140), applications 215 may correspond to application(s) that may be included within the particular device in accordance with a communication standard, network architecture, encryption standard, etc.

Communication interface 220 may permit device 200 to communicate with other devices, networks, and/or systems. Communication interface 220 may include a wireless and/or a wired interface. Communication interface 220 may also include a transceiver-like component.

Input 225 may permit a user and/or another device to input information into device 200. For example, input 225 may include a keyboard, a keypad, a mouse, a button, a switch, a knob, a touchpad, an input port, a display, voice recognition logic, and/or some other type of input component. Output 230 may permit device 200 to output information to the user and/or another device. For example, output 230 may include a display, light emitting diodes (LEDs), an output port, a speaker, and/or some other type of output component.

As described herein, device 200 may perform certain operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

As previously described, the exemplary implementations described herein may not change the DHCP state machine; may not permit network access prior to authentication; may operate in-band versus out-of-band, where an out-of-band may involve assigning temporary network addresses, thus requiring subsequent network address assignments; may traverse layer 2 devices (e.g., bridges, etc.); and/or may allow for authentication of multiple DHCP clients of the same local loop. Further, the methods, devices, and/or computer-readable media for authenticating DHCP clients may provide backward compatibility with legacy user devices 110 that may include legacy DHCP clients 115 that would not normally support the authenticating described herein. In an exemplary implementation, the authentication device may recognize whether user device 110 is a legacy device or not. In such an implementation, the authentication device may not generate an encrypted challenge response and the intermediary device may not send to the legacy user device 110 a CHAP challenge, etc. In another exemplary implementation, DHCP server 130 or a DHCP relay may recognize whether user device 110 is a legacy device or not. In such an implementation, a challenge need not be generated or sent to the authentication device or DHCP client 115.

Exemplary Environment Interactions

Figure 3:
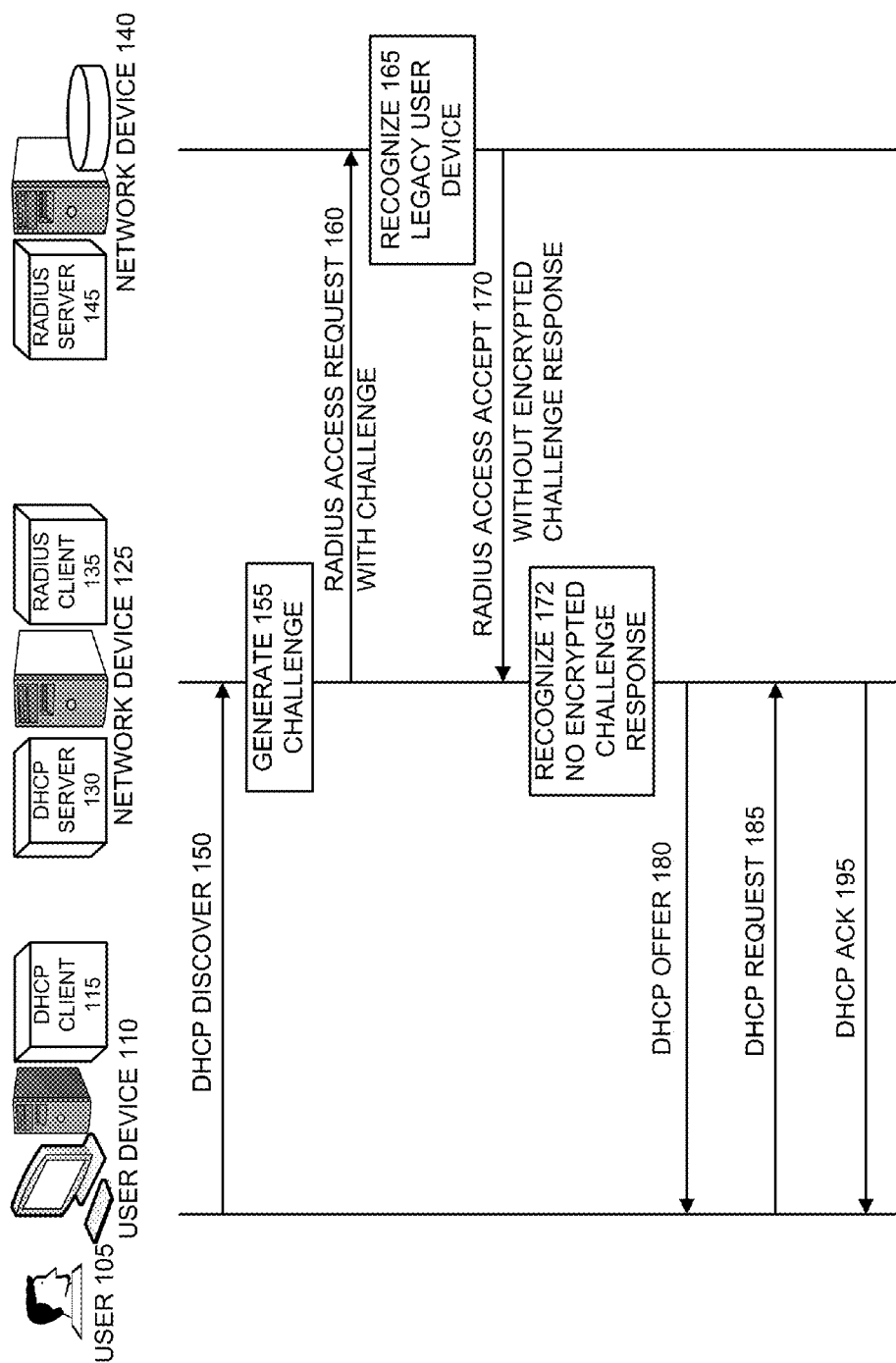
FIG. 3 is a message timing diagram illustrating an exemplary implementation where a user device corresponds to a legacy user device.

FIG. 3 is a message timing diagram illustrating an exemplary implementation where user device 110 corresponds to a legacy user device 110. As illustrated, DHCP client 115 may generate DHCP DISCOVER message 150 and send DHCP DISCOVER message 150 to DHCP server 130 of network device 125. In an exemplary implementation, DHCP DISCOVER message 150 may include information so as to identify user device 110 using a variety of methods. As will be described below, network device 140 may utilize this information to recognize that user device 110 corresponds to a legacy user device 110.

In an exemplary implementation, user device 110 may be identified using a variety of methods. For example, user device 110 may be identified via one or more of: a client identification (ID) field (e.g., provided from a DHCP packet); a client media access control (MAC) address; a circuit ID (e.g., a client's physical connection as reported by a network device initiating an authentication); Option 82 (e.g., a circuit ID (i.e., "option82"), as appended to a DHCP DISCOVER packet by a DHCP relay provided between a DHCP client and a DHCP server, in case the DHCP server is initiating the authentication); a user domain (e.g., as determined by a DHCP server); etc.

In response to receiving DHCP DISCOVER message 150, network device 125 may generate a CHAP challenge, as indicated by reference number 155. For example, the CHAP challenge may correspond to a string having a random value. Radius client 135 may generate RADIUS access-request message 160 and may insert the CHAP challenge in RADIUS access-request message 160. For example, the CHAP challenge may be inserted in an authenticator field or an attributes field of RADIUS access-request message 160. Additionally, in an exemplary implementation, the DHCP Option 82 information may be included with RADIUS access-request message 160. RADIUS client 135 may send RADIUS access request message 160 including the CHAP challenge (and DHCP Option 82 information) to RADIUS server 145 of network device 140.

RADIUS server 145 may receive RADIUS access request message 160 including the CHAP challenge and DHCP Option 82 information. In contrast to FIG. 1B, however, network device 140 may recognize (e.g., as indicated by reference number 165) that user device 110 is a legacy user device based on the DHCP Option 82 information and/or user device information that may be stored by network device 140. As a result, network device 140 may not generate an encrypted challenge response. Rather, RADIUS server 145 may generate RADIUS access-accept message 170 and may not insert an encrypted challenge response. RADIUS server 145 may send RADIUS access-accept message 170 to network device 125.

RADIUS client 130 may receive RADIUS access-accept message 170. Network device 125 may recognize that RADIUS access-accept message 170 does not include an encrypted challenge response, as indicated by reference number 172. As a result, DHCP server 130 may generate and send DHCP OFFER message 180 to DHCP client 115 without including a CHAP challenge. DHCP client 115 may receive DHCP OFFER message 180. In response thereto, DHCP client 115 may generate and send a DHCP REQUEST 185 to DHCP server 130. DHCP server 130 may generate and send a DHCP ACK message 195 to DHCP client 115.

As previously described, in an exemplary implementation, DHCP server 130 of network device 125 may send DHCP OFFER message 180 before authentication so network information may be shared with an unsecure (i.e., not authenticated) DHCP client 115. Nevertheless, DHCP client 115 may be prevented from accessing network 120 by other means (e.g., no installation of an access route, no service activation, etc.) if authentication fails.

Figure 4:
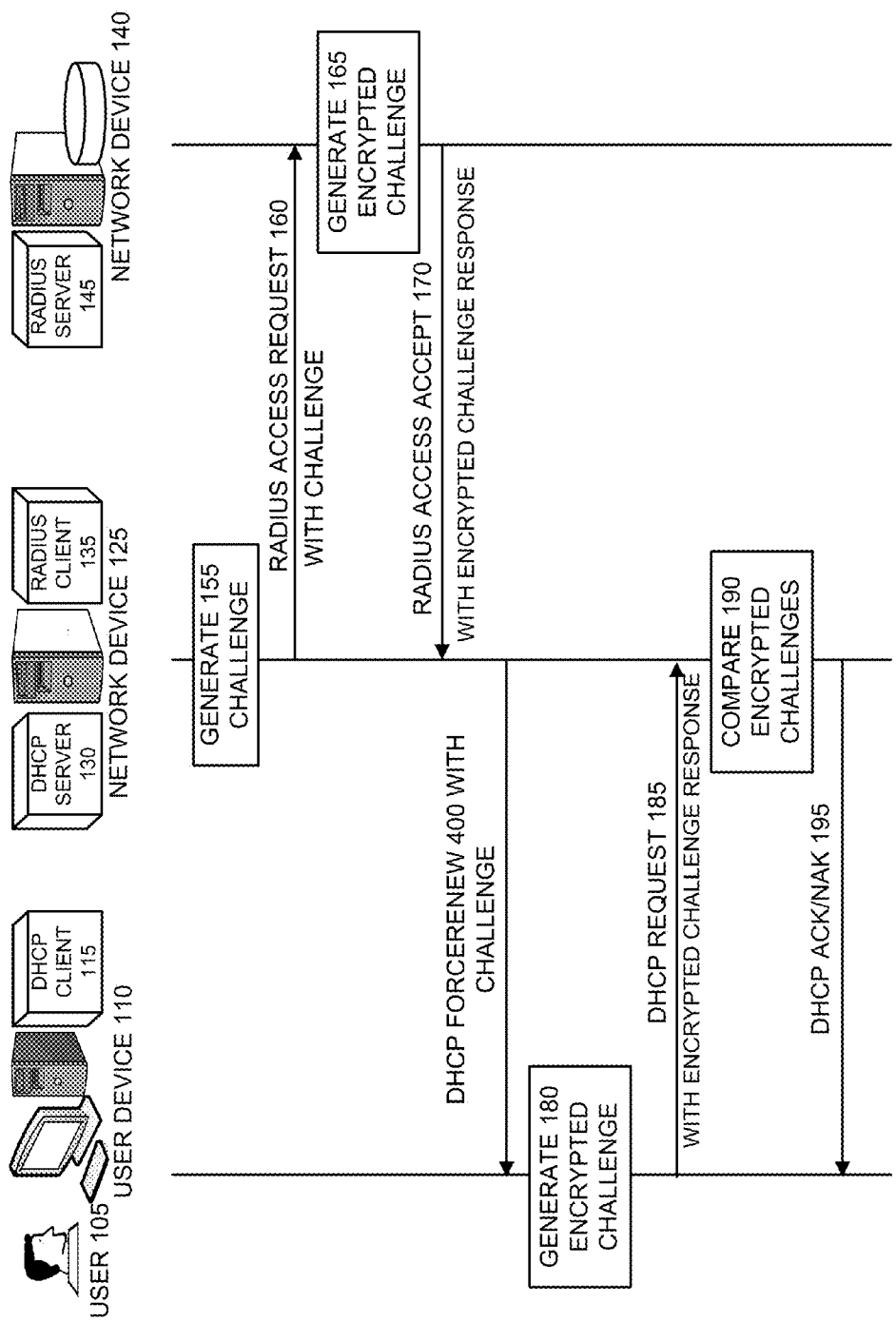
FIG. 4 is a message timing diagram illustrating an exemplary implementation of a forced-renew.

Additionally, in an exemplary implementation, a forced-renew may be implemented to minimize a length of time associated with an attack and/or provide replay protection. FIG. 4 is a message timing diagram illustrating an exemplary implementation of a forced-renew in which a subsequent challenge and authentication process may take place. For example, assume that network device 125 generates challenges periodically or based on other triggering events. In one example, network device 125 may generate a DHCP FORCERENEW message 400. User device 110 and network device 140 may generate new encrypted challenges that may be compared by network device 125, as illustrated in FIG. 4. In instances when the encrypted challenges do not match, authentication may fail and security prevention measures may be actuated.

Figure 5:
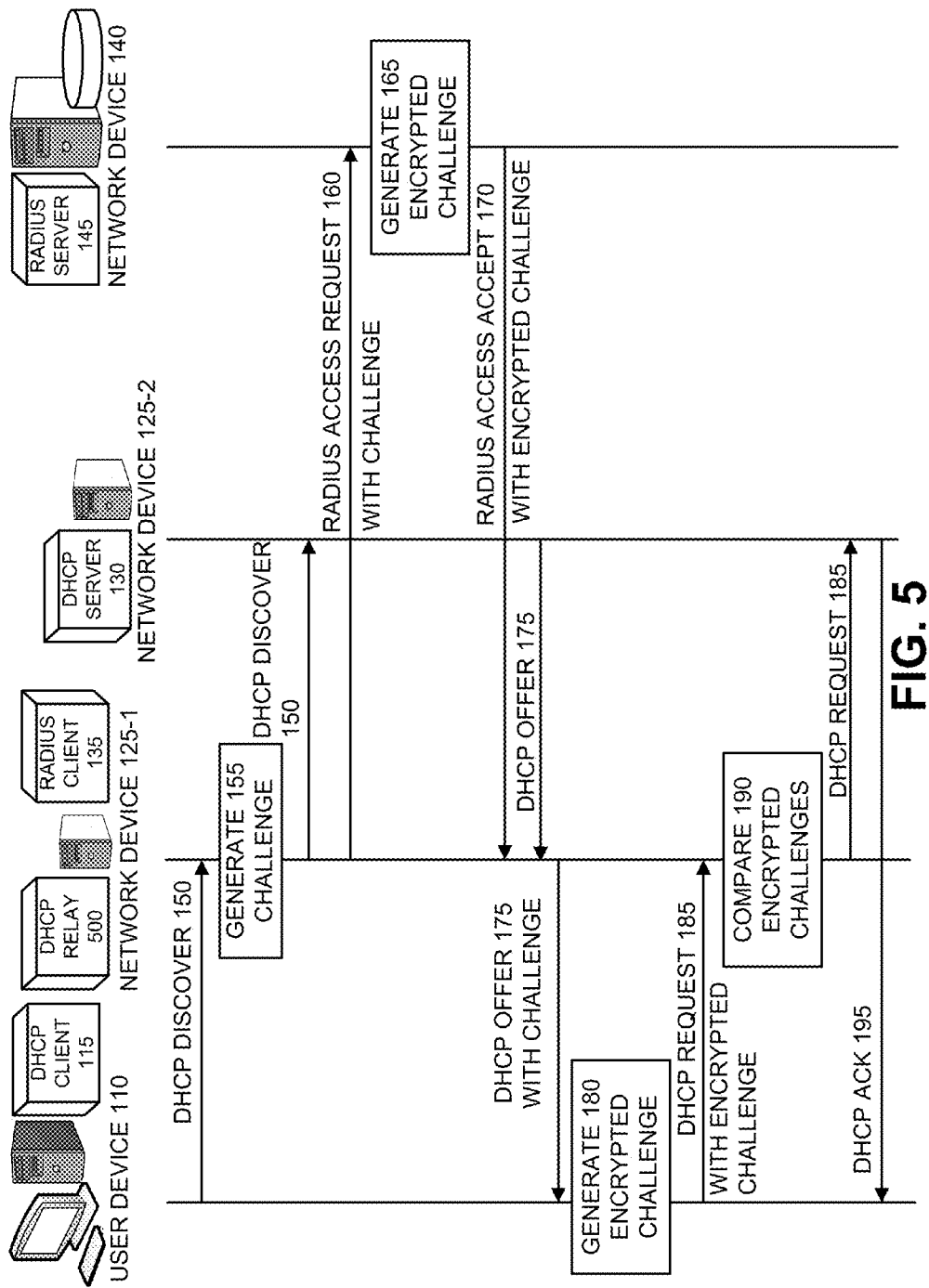
FIG. 5 is a message timing diagram illustrating an exemplary implementation for authenticating for the DHCP client utilizing a DHCP relay.

Additionally, as previously described, network 120 may include a DHCP relay. The DHCP relay may forward DHCP messages between DHCP client 115 and DHCP server 130. FIG. 5 is a message timing diagram illustrating an exemplary implementation for providing authentication of a DHCP client utilizing a DHCP relay 500. In this case, RADIUS client 135 and DHCP relay 500 may be co-located on network device 125-1. As illustrated, network device 125-1 may receive DHCP DISCOVER message 150. In response thereto, network device 125-1 may generate a challenge, as indicated by reference number 155. Network device 125-1 may insert the challenge in RADIUS access-request message 160 and send RADIUS access-request message 160, with the challenge, to RADIUS server 145 of network device 140. Additionally, network device 125-1 may forward DHCP DISCOVER message 150 to DHCP server 130 of network device 125-2.

Similar to that previously described, network device 125-1 may receive RADIUS access-accept message 170 including an encrypted challenge response from network device 140. Network device 125-1 may also receive DHCP OFFER message 175 from network device 125-2. DHCP relay 500 may insert the challenge in DHCP OFFER message 175 and send DHCP OFFER message 175 including the challenge to DHCP client 115. DHCP client 115 may receive DHCP OFFER message 175 (e.g., with the challenge), may generate an encrypted challenge, as indicated by reference number 180, and may insert the encrypted challenge response in DHCP REQUEST 185. As further illustrated, network device 125-1 may receive DHCP REQUEST 185 including the encrypted challenge response from DHCP client 115. Network device 125-1 may compare the encrypted challenge responses, as indicated by reference number 190. In an exemplary implementation, in the event that the encrypted challenges match, network device 125-1 may remove the encrypted challenge response from DHCP REQUEST 185 and forward DHCP REQUEST 185 to DHCP server 130. DHCP server 130 may send DHCP acknowledgement 195 to DHCP client 115. In an exemplary implementation, in the event that the encrypted challenge responses do not match, network device 125-1 may not respond to DHCP client 115 and may not forward DHCP REQUEST 185 to DHCP server 130.

Exemplary Process

Figure 6:
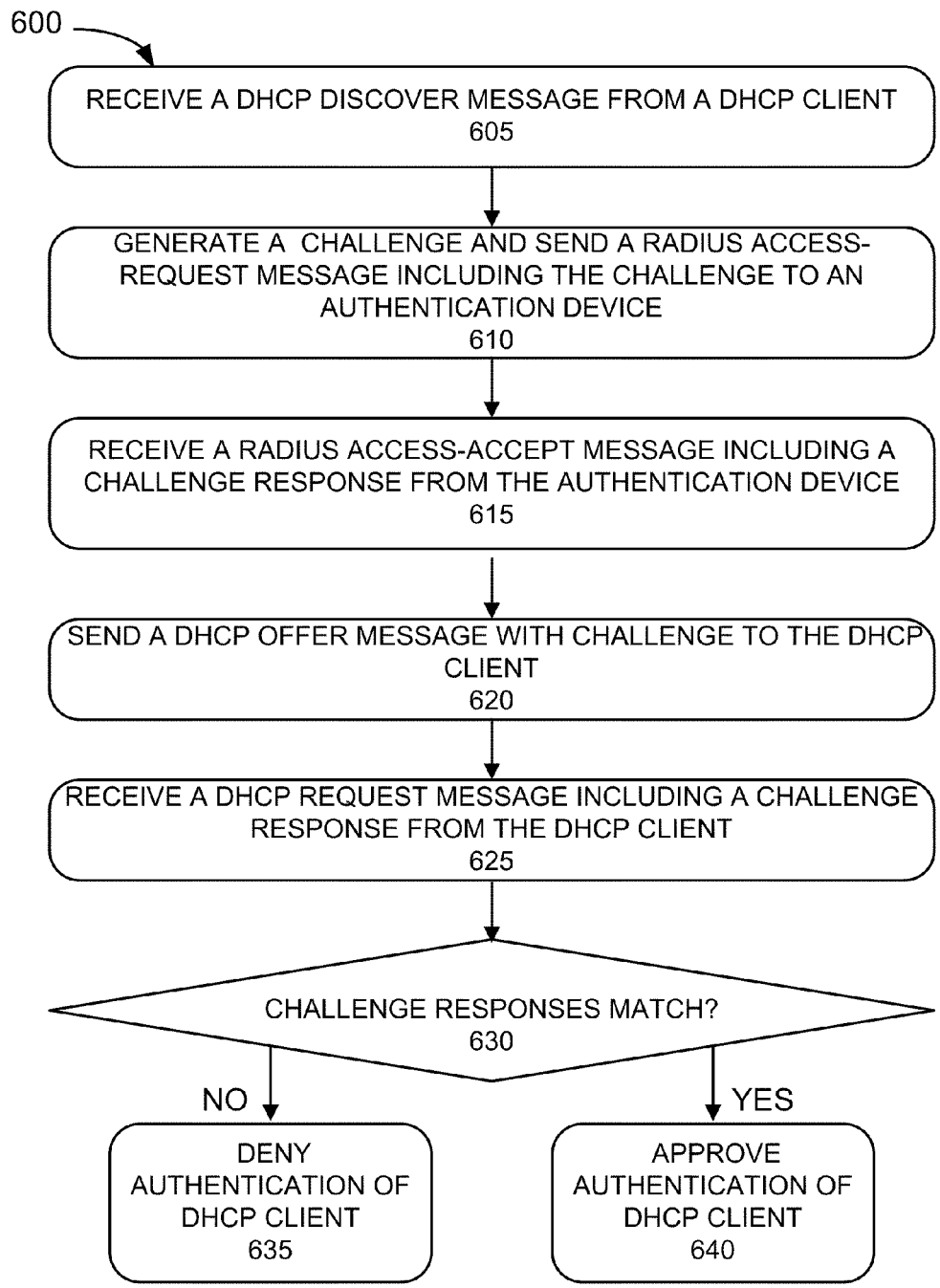
FIG. 6 is a flow diagram illustrating an exemplary process for authenticating the DHCP client.

In an exemplary implementation, a DHCP server may be utilized to provide authentication of a DHCP client. FIG. 6 is a flow diagram illustrating an exemplary process for authenticating a DHCP client.

A DHCP DISCOVER message may be received from a DHCP client (block 605). For example, DHCP client 115 may generate DHCP DISCOVER message 150 and send DHCP DISCOVER message 150 to DHCP server 130 of network device 125.

A challenge may be generated and a RADIUS access-request message including the challenge may be sent to an authentication device (block 610). For example, in response to receiving DHCP DISCOVER message 150, network device 125 may generate 155 a challenge. In an exemplary implementation, the challenge may correspond to a CHAP challenge. For example, the CHAP challenge may correspond to a string having a random value. Radius client 135 may generate RADIUS access-request message 160 and may insert the CHAP challenge in RADIUS access-request message 160. For example, the CHAP challenge may be inserted in an authenticator field or an attributes field of RADIUS access-request message 160. RADIUS client 135 may send RADIUS access request message 160 including the CHAP challenge to RADIUS server 145 of network device 140.

A RADIUS access-accept message including a challenge response may be received from the authentication device (block 615). For example, network device 140 may utilize the shared secret (e.g., a password, a personal identifier, or some other secret information) that may be known to both network device 140 and user device 110. RADIUS server 145 may generate 165 (e.g., using an MD5 hash) an encrypted challenge response. RADIUS server 145 may generate RADIUS access-accept message 170 and may insert the encrypted challenge response in RADIUS access-accept message 170. For example, the encrypted challenge response may be inserted in an authentication field or an attributes field of RADIUS access-accept message 170. RADIUS server 145 may send RADIUS access-accept message 170 including the encrypted challenge response to network device 125.

A DHCP OFFER message including the challenge may be sent to the DHCP client (block 620). For example, DHCP server 130 may generate DHCP OFFER message 175. DHCP server 130 may insert the CHAP challenge into DHCP OFFER message 175. For example, the CHAP challenge may be inserted in a DHCP options field of DHCP OFFER message 175. DHCP server 130 may send DHCP OFFER message 175 with the CHAP challenge to user device 110.

A DHCP REQUEST message including a challenge response may be received from the DHCP client (block 625). For example, user device 110 may generate 180 (e.g., using an MD5 hash) an encrypted challenge response based on the shared secret. DHCP client 115 may generate DHCP REQUEST 185 and may insert the encrypted challenge response in DHCP REQUEST 185. For example, the encrypted challenge response may be inserted in a DHCP options field of DHCP REQUEST 185. DHCP client 115 may send DHCP REQUEST 185 with the encrypted challenge to network device 125.

It may be determined whether the challenge responses match (block 630). For example, network device 125 may compare the encrypted challenges received from both user device 110 and network device 140.

If it is determined that the challenge responses do not match (block 630—NO), authentication of the DHCP client may be denied (block 635). For example, DHCP server 130 may send DHCP negative acknowledgement 195 to DHCP client 115.

If it is determined that the challenge responses match (block 630—YES), authentication of the DHCP client may be approved (block 640). For example, DHCP server 130 may send DHCP acknowledgement 195 to DHCP client 115.

Although FIG. 6 illustrates an exemplary process 600, in other implementations, fewer, additional, and/or different operations may be performed than those depicted in FIG. 6 and described. For example, as previously described, the authentication server may correspond to an AAA server which may utilize a protocol different from the RADIUS protocol (e.g., the Diameter protocol). In such an implementation, network device 125 may send a Diameter or other authentication request including a challenge and may receive a Diameter answer including a challenge response. Further, as previously described with respect to FIG. 5, a DHCP relay may perform one or more operations associated with process 600.

Conclusion

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 6, the order of the blocks may be modified in other implementations. Further, non-dependent blocks may be performed in parallel.

Also, certain aspects have been described as being implemented as a "component" that performs one or more functions. This component may include hardware, such as processing system 205, or a combination of hardware and software, such as processing system 205 executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
   receiving, by a network device, a Dynamic Host Configuration Protocol (DHCP) DISCOVER message from a DHCP client of a user device,
      the DHCP DISCOVER message relating to network access;
   generating, by the network device, a challenge based on receiving the DHCP DISCOVER message;
   sending, by the network device, the challenge, to an authentication device, in a Remote Authentication Dial In User Service (RADIUS) access-request message;
   receiving, by the network device, a RADIUS access-accept message from the authentication device based on sending the challenge to the authentication device,
      the RADIUS access-accept message not including a first challenge response when the RADIUS access-request message includes a DHCP option information identifying the user device as a device of a particular type, and
      the RADIUS access-accept message including the first challenge response when the RADIUS access-request message does not include the DHCP option information;
   generating, by the network device, a DHCP OFFER message;
   determining, by the network device, whether the RADIUS access-accept message, from the authentication device, includes the first challenge response;
   when the RADIUS access-accept message, from the authentication device, does not include the first challenge response:
      sending, by the network device, the DHCP OFFER message, to the DHCP client,
         the challenge not being sent to the DHCP client; and
      authenticating, by the network device, the DHCP client,
         the user device not being permitted the network access prior to authenticating the DHCP client; and
   when the RADIUS access-accept message, from the authentication device, includes the first challenge response:
      sending, by the network device and to the DHCP client, the DHCP OFFER message and the challenge;
      receiving, by the network device and based on sending the DHCP OFFER message and the challenge to the DHCP client, a DHCP REQUEST message that includes a second challenge response from the DHCP client;
      comparing, by the network device, the first challenge response with the second challenge response; and
      authenticating, by the network device, the DHCP client when the first challenge response and the second challenge response match,
         the user device not being permitted the network access prior to authenticating the DHCP client.

2. The method of claim 1, where the authentication device includes one of a RADIUS server or an Authentication, Authorization, and Accounting (AAA) server.

3. The method of claim 1, where sending the DHCP OFFER message and the challenge to the DHCP client includes:
   inserting the challenge in a DHCP options field of the DHCP OFFER message when the message, from the authentication device, includes the first challenge response.

4. The method of claim 1, where the RADIUS access-accept message, from the authentication device, includes the first challenge response,
   the method further comprising:
      sending a DHCP acknowledgement to the DHCP client when the first challenge response and the second challenge response match.

5. The method of claim 1, further comprising:
   sending another challenge to the authentication device and the DHCP client after authenticating the DHCP client;
   receiving, based on sending the other challenge, a first other challenge response from the authentication device and a second other challenge response from the DHCP client;
   comparing the first other challenge response with the second other challenge response; and
   renewing authentication of the DHCP client when the first other challenge response and the second other challenge response match.

6. The method of claim 1, where the RADIUS access-accept message, from the authentication device, includes the first challenge response,
   the method further comprising:
      denying authentication of the DHCP client when the first challenge response and the second challenge response do not match.

7. A network device comprising:
   one or more memories to store instructions; and
   one or more processors to execute at least one of the instructions in the one or more memories to:
      receive a Dynamic Host Configuration Protocol (DHCP) DISCOVER message, from a DHCP client of a user device, relating to network access by the user device;
      generate a challenge based on the DHCP DISCOVER message;
      send the challenge, to an authentication device, in a Remote Authentication Dial In User Service (RADIUS) access-request message;
      receive a first challenge response in a RADIUS access-accept message from the authentication device,
         the RADIUS access-accept message including the first challenge response based on the RADIUS access-request message not including information identifying the user device as a device of a particular type;
      generate a DHCP OFFER message that includes the challenge;
      send the DHCP OFFER message, including the challenge, to the DHCP client based on receiving the first challenge response in the RADIUS access-accept message from the authentication device;
receive a DHCP REQUEST message that includes a second challenge response from the DHCP client;
compare the first challenge response with the second challenge response; and
authenticate the DHCP client when the first challenge response and the second challenge response match,
the user device not being permitted the network access prior to authenticating the DHCP client.

8. The network device of claim 7, where the network device corresponds to a DHCP server.

9. The network device of claim 7, where, when sending the challenge to the authentication device, the one or more processors are further to execute one or more of the instructions in the one or more memories to:
insert the challenge in RADIUS access-request message.

10. The network device of claim 7, where the one or more processors are further to execute one or more of the instructions in the one or more memories to:
send a DHCP acknowledgement to the DHCP client when the first challenge response and the second challenge response match.

11. The network device of claim 7, where, after authenticating the DHCP client, the one or more processors are further to execute one or more of the instructions in the one or more memories to:
send another challenge to the authentication device and the DHCP client;
receive, based on sending the other challenge, a first other challenge response from the authentication device and a second other challenge response from the DHCP client;
compare the first other challenge response with the second other challenge response; and
renew authentication of the DHCP client when the first other challenge response and the second other challenge response match.

12. The network device of claim 7, where the one or more processors are further to execute one or more of the instructions in the one or more memories to:
send a different challenge to the authentication device and the DHCP client on a periodic basis.

13. The network device of claim 7, where the one or more processors are further to execute one or more of the instructions in the one or more memories to:
deny authentication of the DHCP client when the first challenge response and the second challenge response do not match.

14. The network device of claim 7, where the authentication device includes one of a Remote Authentication Dial In User Service (RADIUS) server or an Authentication, Authorization, and Accounting (AAA) server.

15. A non-transitory computer-readable medium for storing instructions, the instructions comprising:
one or more instructions which, when executed by a device, cause the device to generate a challenge based on receiving a Dynamic Host Configuration Protocol (DHCP) DISCOVER message from a DHCP client of another device;
one or more instructions which, when executed by the device, cause the device to send a message, including the challenge, to an authentication device;
one or more instructions which, when executed by the device, cause the device to receive a message from the authentication device based on sending the challenge to the authentication device,
the received message not including a first challenge response when the sent message includes a DHCP option information identifying the other device as a device of a particular type, and
the received message including the first challenge response when the sent message does not include the DHCP option information;
one or more instructions which, when executed by the device, cause the device to generate a DHCP OFFER message;
one or more instructions which, when executed by the device, cause the device to send the DHCP OFFER message to the DHCP client when the received message does not include the first challenge response,
the challenge not being sent to the DHCP client when the received message does not include the first challenge response;
one or more instructions which, when executed by the device, cause the device to authenticate the DHCP client based on sending the DHCP OFFER message to the DHCP client when the received message does not include the first challenge response,
the other device not being permitted network access prior to authenticating the DHCP client;
one or more instructions which, when executed by the device, cause the device to send the DHCP OFFER message and the challenge to the DHCP client when the received message includes the first challenge response;
one or more instructions which, when executed by the device, cause the device to receive, based on sending the challenge to the DHCP client and from the DHCP client, a DHCP REQUEST message that includes a second challenge response;
one or more instructions which, when executed by the device, cause the device to compare the first challenge response with the second challenge response; and
one or more instructions which, when executed by the device, cause the device to authenticate the DHCP client when the first challenge response and the second challenge response match,
the other device not being permitted network access prior to authenticating the DHCP client.

16. The non-transitory computer-readable medium of claim 15, where the device includes a DHCP server, and where the instructions further comprise:
one or more instructions which, when executed by the device, cause the device to send a DHCP acknowledgement to the DHCP client when the first challenge response and the second challenge response match.

17. The non-transitory computer-readable medium of claim 15, the instructions further comprising:
one or more instructions which, when executed by the device, cause the device to send a DHCP acknowledgement to the DHCP client when the first challenge response and the second challenge response match.

18. The non-transitory computer-readable medium of claim 15, the instructions further comprising:
one or more instructions which, when executed by the device, cause the device to deny authentication of the DHCP client when the first challenge response and the second challenge response do not match.

19. The non-transitory computer-readable medium of claim 15, the instructions further comprising:
one or more instructions which, when executed by the device, cause the device to send another challenge to the authentication device and the DHCP client;

one or more instructions which, when executed by the device, cause the device to receive a first other challenge response from the authentication device and a second other challenge response from the DHCP client;

one or more instructions which, when executed by the device, cause the device to compare the first other challenge response with the second other challenge response; and one or more instructions which, when executed by the device, cause the device to authenticate the DHCP client when the first other challenge response and the second other challenge response match.

20. The non-transitory computer-readable medium of claim 15, where the authentication device includes one of a Remote Authentication Dial In User Service (RADIUS) server or an Authentication, Authorization, and Accounting (AAA) server.

21. The non-transitory computer-readable medium of claim 15, where the sent message corresponds to a Remote Authentication Dial In User Service (RADIUS) access-request message, and where the received message corresponds to a RADIUS access-accept message.

* * * * *